United States Patent [19]

Schneider, Jr.

[11] 4,353,259

[45] Oct. 12, 1982

[54] FIBER OPTIC ACCELERATION SENSOR

[75] Inventor: Clayton J. Schneider, Jr., East Aurora, N.Y.

[73] Assignee: Calspan Corporation, Buffalo, N.Y.

[21] Appl. No.: 197,299

[22] Filed: Oct. 15, 1980

[51] Int. Cl.³ .................. G01P 3/36; G01P 15/08
[52] U.S. Cl. .................... 73/653; 73/499; 73/510; 73/517 R; 73/518
[58] Field of Search ........... 73/651, 653, 655, 517 R, 73/516 R, 518, 521, 499, 510; 250/227

[56] References Cited

U.S. PATENT DOCUMENTS

| | | | |
|---|---|---|---|
| 2,601,440 | 6/1952 | Kerrigan | 73/492 X |
| 3,146,057 | 8/1964 | Rona | 73/651 X |
| 3,224,279 | 12/1965 | Galli et al. | 73/517 R |

FOREIGN PATENT DOCUMENTS 820288  9/1959  United Kingdom ............. 73/499

Primary Examiner—James J. Gill
Attorney, Agent, or Firm—Biebel, French & Nauman

[57] ABSTRACT

The deflection, due to inertia, of the free end of the cantilever rod of fiber optic material is an indication of the acceleration of the supporting structure of the rod. The indication of the deflection of the rod is by detecting light propagating the free end of the rod. Disclosed are fiber optic rod sensing element structures for acceleration indicators, a rate of change of acceleration indicator, a rotation indicator, and a latching acceleration indicator.

8 Claims, 13 Drawing Figures

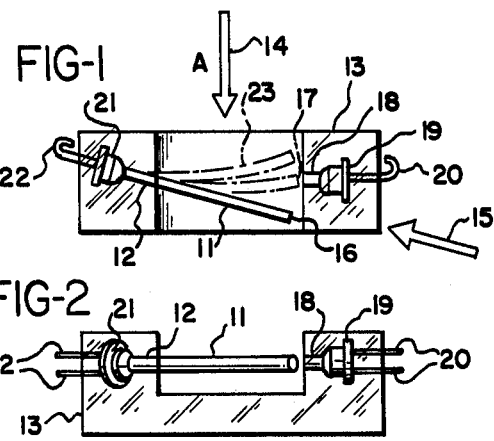
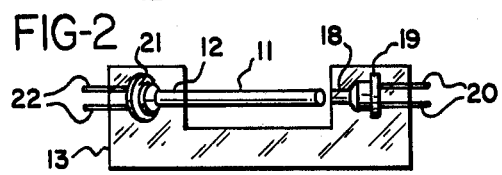
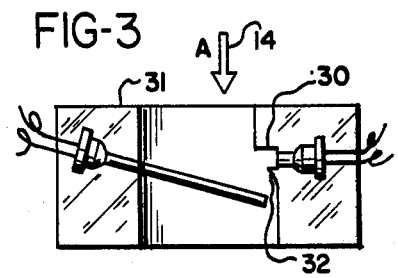
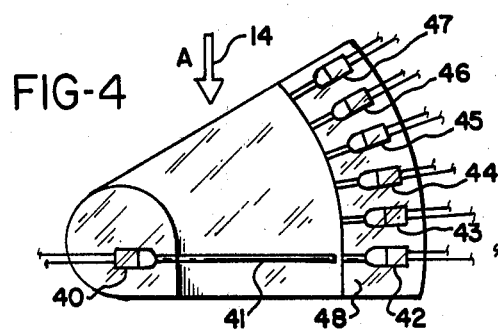
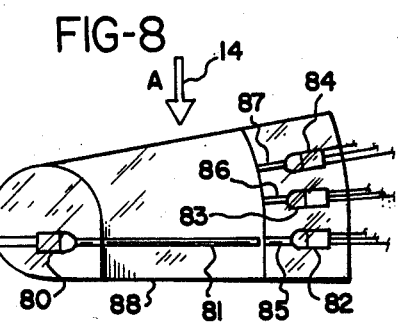
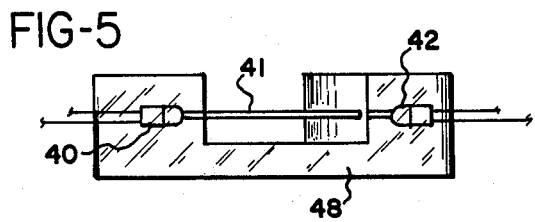
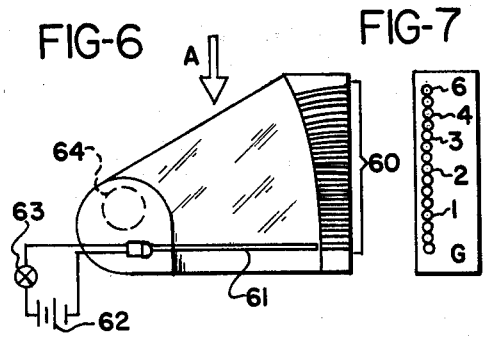
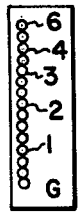
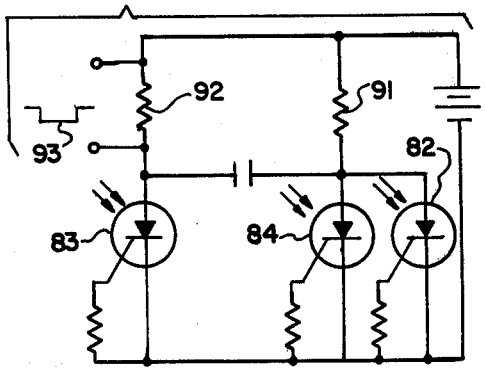

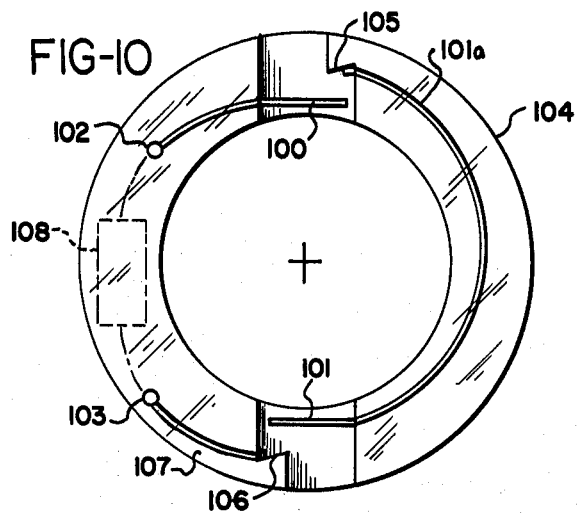
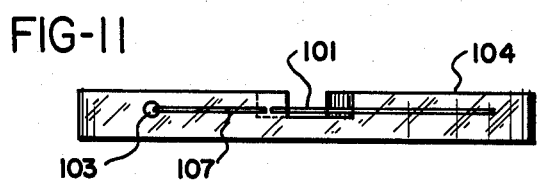
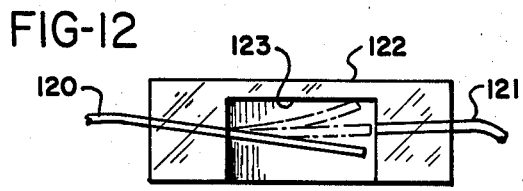
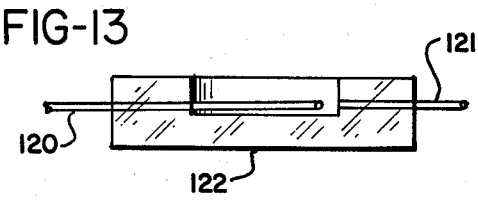

FIBER OPTIC ACCELERATION SENSOR

BACKGROUND OF THE INVENTION

The field of the invention is in the accelerometer art and more particularly in that of accelerometers having opto-electric sensing elements.

Acceleration switches and sensors are well known in the prior art. Generally they consist of a spring supported mass with the movement of the mass mechanically linked to the slider of a potentiometer or otherwise coupled to a means for indicating or switching. The prior art devices are generally large and not readily adaptable for high values of acceleration. In addition, they have contacts that are susceptible to corrosion, contaminants, and varying pressure levels, all of which greatly decreases their long-term reliability whether in the active or inactive state in the interim. Acceleration sensors are widely used in the monitoring of launching operations of projectiles, missiles, and rockets. To properly design high-speed transportation equipment, it is necessary to know the effects on structures and people when they are submitted to known magnitudes of accelerating forces. In all these instances, acceleration measuring and detecting instruments are required.

SUMMARY OF THE INVENTION

The invention provides a simple, rugged, compact, G force and rotation sensor utilizing the bending characteristics of a cantilever fiber optic rod. The mass of the rod is the inertia element of the sensor and the stiffness of the rod provides the restoring force. Light injected into one end of the rod is detected at the other end at a predetermined deflection position indicating an acceleration of a predetermined amount.

It is thus an object of the invention to provide an acceleration indicator having a fiber optic rod as a sensing element.

It is an object of the invention to provide a fiber optic mechanically latching acceleration sensor.

It is an object of the invention to provide a fiber optic acceleration sensor of discreet steps of magnitudes of acceleration.

It is an object of the invention to provide a fiber optic rate of change of acceleration sensor.

It is an object of the invention to provide a compact direct visual read fiber optic acceleration indicator.

It is an object of the invention to provide a rotation sensor having a fiber optic rod as a sensing element.

BRIEF DESCRIPTION OF THE DRAWING

FIG. 1 is a schematic-pictorial plan view of an embodiment of the invention;

FIG. 2 is a schematic-pictorial front elevation view of the embodiment illustrated in FIG. 1;

FIG. 3 is a plan view of an embodiment of a fiber optic rod latching acceleration sensor;

FIG. 4 is a schematic-pictorial plan view of an embodiment of a fiber optic rod acceleration sensor for sensing in steps various magnitudes of acceleration;

FIG. 5 is a schematic-pictorial elevation view of the sensor illustrated in FIG. 4;

FIG. 6 is a schematic-pictorial side view of an embodiment of a compact direct reading fiber optic rod acceleration sensor;

FIG. 7 is a schematic-pictorial front view of the embodiment illustrated in FIG. 6;

FIG. 8 is a schematic-pictorial plan view of an embodiment of a fiber optic rod rate of change of acceleration sensor;

FIG. 9 is an electronic schematic diagram of a suitable circuit for the sensor illustrated in FIG. 8;

FIG. 10 is a schematic-pictorial view of an embodiment of a fiber optic rod rotation sensor;

FIG. 11 is an elevation view of the embodiment illustrated in FIG. 10;

FIG. 12 is a schematic-pictorial view of an embodiment of a fiber optic rod acceleration sensor having a limiting stop and fiber optic rod coupling to an external light source and detector; and FIG. 13 is an elevation view of a sensor illustrated in FIG. 12.

DESCRIPTION OF THE PREFERRED EMBODIMENTS

FIGS. 1 and 2 illustrate schematically a typical embodiment of the invention. Fiber optic rod 11 is cantilever supported by end 12 being cast in plastic supporting structure 13. The supporting structure 13 is illustrated as transparent plastic for ease of illustration. Generally, opaque material is preferred for preventing any unwanted light reflections. When the supporting structure 13 is at rest, the rod 11 is in the position shown. When the supporting structure 13 is accelerated as represented by acceleration vector 14, the fiber optic rod will bend back as shown in dotted form an amount that is a function of the magnitude of acceleration vector 14. The invention is not critically sensitive to the direction of acceleration. Variations in the direction of acceleration up to ±15° are generally negligible. Obviously, the most sensitive direction for small movements of the rod is a direction that is at 90° to the rest position of the rod. Generally, the sensor is oriented so that the direction of the acceleration is substantially at right angles to the nominal position of the rod for the magnitude of acceleration being indicated. Of course, the rod, when under acceleration forces is no longer straight but curved. Acceleration forces (±) having a vectorial direction 15, being substantially along the axis of the rod, have substantially no effect on the device.

When light energy is introduced in end 12 of rod 11, it will propagate out the free end 16 of the rod. When the supporting structure 13 is undergoing an acceleration sufficient to bend the fiber optic rod 11 to the position 17, the light emanating the free end of the rod propagates into the short section of fiber optic rod 18 which is conventionally coupled to light detector 19, and provides an electrical signal on conductor 20. The frequency of the light energy is critical only to the extent that the light detecting characteristics of detector 19 be compatible with the light emitting characteristics of emitter 21. Conventional light emitting diodes are suitable for the emitter and PIN photodiodes are suitable for the detector. A conventional incandescent lamp may be used for the light source and a photocell or photo-resistor may be used for the light detector. Exitation voltage applied to the conductors 22 of the light source is from a conventional source such as a battery of appropriate electrical parameters for the light source being used.

The invention provides an output signal on electrical conductors 20 at a predetermined amount of acceleration, (that which bends the fiber optic rod 11 to position 17). This signal is available for further utilization, such as to reduce the input power that is causing the body to which the sensor is attached to accelerate. Thus, tending to keep the acceleration of the body below a predetermined value. As another example of the utilization of the disclosed acceleration sensor, the device will produce a signal that can be used to reduce the braking action on a device that is being slowed too rapidly. Likewise, the acceleration may be kept above a predetermined magnitude with the fiber optic rod substantially maintained in a position past the detector such as 23, and when the acceleration slows to the predetermined amount as indicated by an output signal, the apparatus bearing the rod supporting structure 13 is "speeded up" so as to move the rod to a position away from the detector such as indicated at 23. Those practicing this invention will readily determine the length and cross-section of a cantilever rod and a placement of the detector for the desired deflection (within the elastic limits of the rod), for a predetermined magnitude of acceleration, taking into consideration the well-known physical constants and bending characteristics of fiber optic rods.

Embodiments of the invention may be further "tuned" to adjust the rod deflection in a particular embodiment to a particular magnitude of acceleration by appropriately painting the cantilever rod with an elastic paint. A finely divided metal-powder-filled acrylic lacquer is a suitable paint. Painting the rod near the free end (primarily adding mass to the moving system), will cause the rod to bend further for a given acceleration. Painting the rod near the support tends to add more stiffness effect than mass effect and a greater acceleration will be required to provide the same deflection. The direction light propagates through this system is immaterial, i.e., 21 could just as well be the detector and 19 the light emitter. It is not necessary that the light emitting means and the light detecting means be adjacent the cantilever member. The fiber optic rods 11 and 18 may be extended exterior the particular structure 13 as illustrated by fiber optic rods 120 and 121 in FIGS. 12 and 13. The fiber optic rods are then remotely coupled in the well-known conventional manner to an emitter and a detector.

FIG. 3 schematically illustrates an acceleration sensor similar to the one just described except that it has a ledge 30 stopping further movement of the rod under acceleration forces exceeding the indicated amount. Thus, when acceleration of the fiber optic rod supporting structure is equal to or greater than the predetermined amount, an output signal is provided. The supporting structure illustrated in FIG. 3 also has a protruding lip 32 latching or securing the fiber optic rod such that the sensor stays in the "on" position once the design magnitude of acceleration has been obtained. Similar sensors without the latching feature are illustrated in FIG. 10. FIG. 4 illustrates an embodiment of the invention that provides step indications of magnitudes of acceleration. Generally, the light source 40 is coupled to the fixed end of the cantilever fiber optic rod element 41. The free end of the rod 41 from the rest position moves successively from light detector 42 past light detectors 43–47 with corresponding increasing acceleration magnitudes of the supporting structure 48. The deflection of the fiber optic rod 41 is generally calibrated so that an output from the detectors 43–47 provide an indication of a predetermined magnitude of acceleration. FIG. 5 is a side elevation view of the embodiment illustrated in plan view in FIG. 4. To reverse the light emitter and light detector so as to position the light detector at the fixed end of rod 41 requires the light sources for each magnitude of acceleration be separately coded, such as by color, and the detector be responsive to the coding.

FIGS. 6 and 7 illustrate a simple, direct visual reading, continuous indication, G meter. By adjacent stacking of a plurality of fiber optic rods 60 at the light receiving end of the instrument such that a fist end of each rod element is adjacent the planar arc of traverse of the free end of cantilever rod 61 and the second ends of each of the rod elements form a line in the direction of the acceleration vector A, as illustrated in FIGS. 6 and 7, a continuous indication is provided. The length and diameter of the fiber optic rod 61 depends upon the desired range of the scale of the instrument. The illustration in FIG. 7 represents an instrument indicating acceleration in values of G. Instruments with longer, thinner fiber optic rods reading in fractional values of G, or instruments calibrated to read in feet/second/second or meters/second/second will readily be fabricated by those practicing this invention. The battery 62 and switch 63 may be contained in a recess 64 in the structure of the instrument to provide a completely self-contained unit. The light source for direct visual reading is typically a conventional micro-incandescent lamp. To provide a continuous reading electronic instrument for cooperating with other electronic control circuits, the stacked fiber optic light receiving rods are extended to individual light detecting devices such as the previously illustrated photo-diodes.

FIG. 8 schematically illustrates a rate of change of acceleration sensor. The rate of change of acceleration da/dt is commonly called jerk. Light source 80 provides a light beam to fiber optic rod 81. In a particular embodiment, light activated silicon control rectifiers 82, 83, and 84 are conventionally coupled to short lengths of fiber optic rods 85, 86, and 87, respectively, to provide suitable light detectors. An example of a suitable electronic circuit is schematically diagrammed in FIG. 9. In a particular embodiment, the bending of fiber optic rod 81 by an acceleration force of 1 G brings it into alignment with detector 83. Two G's bring the rod into alignment with detector 84. An increasing acceleration force sweeps the free end of the rod progressively by light detectors 83 and 84. It can thus be seen that in the particular embodiment being described, as an example of a jerk sensor, that if one second elapses between the free end of the rod passing from detector 83 to 84 that the rate of change of acceleration is 1 G per second.

The operation of a suitable electronic circuit for providing a signal for conventional display or for conventional use with a counter either reading time intervals, or one over the time interval, is shown in FIG. 9. At rest, i.e., with light going into detector 82 a large signal appears across load 91. Detectors 83 and 84 are "off". With detector 83 off, substantially no signal appears across load 92. When the fiber optic rod is deflected from detector 82 to detector 83, detector 83 conducts and a voltage signal appears across load 92 and LASCR 82 is turned off. When fiber optic rod 81 moves from detector 83 to detector 84, 84 conducts turning off detector 83 and the voltage across load 92 decreases. Pulse wave form 93 illustrates the signal across load 92 that is present during the time interval the fiber optic rod moves from detector 83 to detector 84. The OR gate arrangement of detectors 82 and 84 is necessary to properly sequence, or reset, the circuit, otherwise without LASCR 82 as the rod returns to the rest position, detector 83 would remain in the conductive state.

A fiber optic rod rotation sensor is schematic-pictorially illustrated in FIGS. 10 and 11. The illustrated embodiment has two fiber optic rod sensing elements 100 and 101. A single sensor may be used to sense rotation. However, a single sensor subjected to a transverse shock (i.e., an acceleration perpendicular to the axis about which the device is to rotate), would function in a normal manner and provide an output indication which could not be distinguished fom an indication of rotation. Thus, a single sensor cannot distinguish between a centrifugal force due to rotation and inertia force due to acceleration taking place in a direction that would correspond to a radius through the sensor. (Centrifugal force may be considered an inertia force due to an acceleration toward the center of rotation.)

A transverse acceleration in a radial direction through the two-sensor embodiment illustrated would tend to close one fiber optic switch but would also tend to further open the other. Thus, no erroneous output indicating rotation would be made. The reliability of rotation sensing embodiments subject to extreme vibrations may be further improved by adding a third sensor, with the angular spacing between each of the three sensors approximately 120°. Three sensors so positioned also decreases the ambiguity of providing a response to rotation about an axis at 90° to the desired sensing axis.

In the embodiment illustrated in FIGS. 10 and 11, the two cantilever fiber optic rod sensing elements 100 and 101 are connected in a series optical arrangement. A conventional light emitter 102 injects light energy into the fiber rod 100. After the fiber optic rod emerges the supporting structure 104 and enters the free space of the notch it becomes a cantilever member and functions as previously described. When the free end of rod 100 moves to rest against stop 105, light is received in the fixed and 101a of fiber optic rod 101 and propagates through it (101) to the free end of its cantilever member. Thus, when the designed, (or greater) rotational speed is reached, the free end of rod 101 also comes to rest on its stop 106 and the light emanating its free end is picked up by fiber optic rod 107 coupled to detector 103 which then provides an electrical output indicating rotation. The light source 102 and light detector 103 may be interchanged since the direction the light travels in the series optical circuit is inconsequential. As previously indicated, the physical dimensions of the fiber optic rods 100 and 101 will be fabricated to provide a closing of the centrifugal switch at the desired rotational velocity.

An output signal from the light detector may, if necessary, be removed fom the ring rotation sensor 104, which is conventionally attached to the apparatus being monitored for rotation, in any number of conventional ways. In some instances, the rotating structure may be self-contained and utilize the signal internally such as in embodiments used for sensing rotation of projectiles in which the rotation signal is utilized to arm the projectile. The signal may be removed from a piece of rotating machinery by conventional slip rings. In the embodiment illustrated in FIGS. 10 and 11, a conventional battery and small electro-magnetic radiation transmitter are contained in the case 108, to radiate a signal which is picked up externally to the rotating structure for further utilization.

FIGS. 12 and 13 have been previously mentioned. The supporting structure 122 of this embodiment provides an overtravel stop 123 to prevent any undue damage from exceedingly large forces.

While the principles of the invention in connection with specific apparatus have been described, it is to be understood that the foregoing detailed descriptions have been made by way of example only and not as a limitation to the scope of the invention as set forth in the accompanying claims.

What is claimed is:

1. A magnitude of jerk detector for providing an indication responsive to a rate of change of acceleration of a supporting structure comprising:
   a. a fiber optic rod having a determined bending characteristic with a first end rigidly positioned in the said supporting structure and the second end moveable through a first arc of deflection responsive to a first magnitude of acceleration and through a second arc of deflection responsive to a second magnitude of acceleration;
   b. a light source optically coupled to said first end of said fiber optic rod;
   c. a first light detector providing an output, positioned in said supporting structure for receiving light from the said second end of the fiber optic rod at the said first arc of deflection;
   d. a second light detector providing an output, positioned in the said supporting structure for receiving light from the said second end of the fiber optic rod at the said second arc of deflection; and
   e. means cooperating with the said output of the first light detector and the said output of the second light detector providing a signal that is a function of the time interval between the output of the first light detector and the output of the second light detector.

2. An acceleration indicator for indicating that a predetermined magnitude of acceleration of a supporting structure has occurred comprising:
   a. a fiber optic rod having a predetermined bending characteristic rigidly positioned at one end in the said supporting structure, with the other end of said rod free and deflectable by an acceleration force;
   b. a stop position in the said supporting structure stopping the movement of the free end of the rod at a deflected position corresponding to said predetermined magnitude of acceleration;
   c. a lip protruding from the said supporting structure for retaining the said rod substantially against said stop after said rod is deflected to said stop by the said magnitude of acceleration; and
   d. means including a light source and a light detector each optically coupled to a respective end of said rod when said free end of rod is positioned adjacent said stop, for indicating said supporting structure has had predetermined magnitude of acceleration.

3. A rotation sensor for indicating rotation of a body about an axis of rotation comprising:
   a. a plurality, from a first to a last, of fiber optic light circuit acceleration sensors having a light input and a light output and a direction of sensing, positioned at a distance from the said axis of rotation in angular spaced apart relationship with the said direction of sensing of each of the sensors located on a radius of said axis of rotation;
   b. means for placing the said plurality of acceleration sensors in series optical relationship from the said first sensor to the said last sensor;

c. means for injecting light into the said light input of the said first acceleration sensor; and d. means for detecting light output from the last acceleration sensor thereby indicating rotation of the said body.

4. The rotaion sensor as claimed in claim 3 wherein the said plurality of acceleration sensors have substantially equal characteristics and are positioned in a radial plane at substantially equal distances from the said axis of rotation and in substantially uniform angular spaced apart relationship.

5. The rotaion sensor as claimed in claim 4 wherein the said means for placing the said plurality of acceleration sensors in series optical relationship includes a fiber optic rod.

6. A direct visual reading accelerometer for indicating a plurality of magnitudes of acceleration in a predetermined vectorial direction of said accelerometer comprising, a. a flexible fiber optic rod having a predetermined cantilever bending characteristic with a support end and a free end;

b. means for cantilever supporting said fiber optic rod in said accelerometer at said support end with the nominal position of said rod, when said accelerometer is at rest, being substantially perpendicular to said vectorial direction, whereby said free end of said rod deflects through a planr arc with a predetermined magnitude of arc responsive to a corresponding magnitude of acceleration in said vectorial direction;

c. means for illuminating said support end of said rod whereby light emanates said free end of said rod; and d. a plurality of fiber optic rod elements having a first end and a second end, positioned in adjacent stacked relationship in a plane containing said deflection arc, with said first end of each of said rod elements positioned adjacent said deflection arc of said free end of said rod for receiving said light emanating said free end of said rod, and with the corresponding respective said second end of each rod element positioned to provide a direct visual indication of a magnitude of acceleration.

7. The accelerometer as claimed in claim 6 wherein the means for illuminating said support end of said rod is contained in said structure.

8. The accelerometer as claimed in claim 7 wherein said second ends of said plurality of fiber optic rod elements are positioned to provide a visual display of magnitudes of acceleration in a line in said vectorial direction of acceleration.

* * * * *